US010140483B1

(12) United States Patent
Huebner et al.

(10) Patent No.: US 10,140,483 B1
(45) Date of Patent: Nov. 27, 2018

(54) ANTENNA EMBEDDED INVENTORY SHELF

(71) Applicant: Amazon Technologies, Inc., Seattle, WA (US)

(72) Inventors: Ronald Eugene Huebner, Seattle, WA (US); Somasundaram Niranjayan, Issaquah, WA (US); Mark Glen McKinnon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/495,838

(22) Filed: Sep. 24, 2014

Related U.S. Application Data

(60) Provisional application No. 62/013,513, filed on Jun. 17, 2014.

(51) Int. Cl.
*G06K 19/077* (2006.01)
*G06K 7/10* (2006.01)
*H01Q 1/40* (2006.01)
*H01Q 1/22* (2006.01)

(52) U.S. Cl.
CPC ..... *G06K 7/10316* (2013.01); *G06K 7/10415* (2013.01); *G06K 7/10465* (2013.01); *H01Q 1/2216* (2013.01); *H01Q 1/40* (2013.01)

(58) Field of Classification Search
USPC ......... 235/493, 385, 492, 488, 439; 343/843
See application file for complete search history.

(56) References Cited

U.S. PATENT DOCUMENTS

| | | |
|---|---|---|
| 6,601,764 B1 | 8/2003 | Goodwin |
| 7,005,985 B1 | 2/2006 | Steeves |
| 7,225,980 B2 | 6/2007 | Ku et al. |
| 7,339,479 B2 | 3/2008 | Nishimura |
| 7,548,165 B2 | 6/2009 | Braun et al. |
| 7,640,185 B1 * | 12/2009 | Giordano et al. .............. 705/23 |
| 7,949,568 B2 | 5/2011 | Fano et al. |
| 8,009,864 B2 | 8/2011 | Linaker et al. |
| 8,175,925 B1 | 5/2012 | Rouaix |
| 8,189,855 B2 | 5/2012 | Opalach et al. |
| 8,423,431 B1 | 4/2013 | Rouaix et al. |
| 8,542,834 B1 | 9/2013 | Feikis et al. |
| 8,630,924 B2 | 1/2014 | Groenevelt et al. |
| 8,688,598 B1 | 4/2014 | Shakes et al. |

(Continued)

FOREIGN PATENT DOCUMENTS

WO 2013126391 A1 8/2013

OTHER PUBLICATIONS

International Search Report and Written Opinion of PCT Application No. PCT/US2015/037287, dated Sep. 30, 2015.

(Continued)

*Primary Examiner* — Allyson Trail
(74) *Attorney, Agent, or Firm* — Athorus, PLLC

(57) ABSTRACT

This disclosure describes the ability to efficiently track inventory using RFID tags (e.g., RFID tags). For example, an inventory shelf located within a materials handling facility may include a series of antenna elements arranged in rows embedded into the shelf that are coupled with an RFID reader. The antenna elements are configured to establish electromagnetic fields oriented along shelf rows. The fields can be used to read RFID tags included or attached to inventory items placed on the shelf row.

24 Claims, 9 Drawing Sheets

(56) References Cited

U.S. PATENT DOCUMENTS

| | | |
|---|---|---|
| 8,893,969 B2 | 11/2014 | Brandl |
| 9,473,747 B2 | 10/2016 | Kobres et al. |
| 2003/0002712 A1 | 1/2003 | Steenburgh et al. |
| 2004/0181467 A1 | 9/2004 | Raiyani et al. |
| 2005/0145688 A1 | 7/2005 | Milenkovic et al. |
| 2005/0183990 A1 | 8/2005 | Corbett |
| 2005/0200476 A1 | 9/2005 | Forr et al. |
| 2005/0203798 A1 | 9/2005 | Jensen et al. |
| 2005/0234774 A1 | 10/2005 | Dupree |
| 2005/0243784 A1 | 11/2005 | Fitzgerald et al. |
| 2006/0038658 A1 | 2/2006 | Jarvis et al. |
| 2006/0145815 A1* | 7/2006 | Lanzieri ............ G06K 7/0008 340/10.2 |
| 2006/0186201 A1 | 8/2006 | Hart |
| 2006/0208859 A1 | 9/2006 | Hougen et al. |
| 2006/0244601 A1 | 11/2006 | Nishimura |
| 2006/0267730 A1 | 11/2006 | Steinke et al. |
| 2007/0018832 A1 | 1/2007 | Beigel et al. |
| 2007/0021197 A1 | 1/2007 | Frerking |
| 2007/0024423 A1 | 2/2007 | Nikitin et al. |
| 2007/0030151 A1 | 2/2007 | Morrow |
| 2007/0075861 A1 | 4/2007 | Cook et al. |
| 2007/0091006 A1* | 4/2007 | Thober et al. ................ 343/745 |
| 2007/0109101 A1 | 5/2007 | Colby |
| 2007/0164863 A1 | 7/2007 | Himberger et al. |
| 2007/0236337 A1 | 10/2007 | Braun et al. |
| 2008/0048861 A1 | 2/2008 | Naidoo et al. |
| 2008/0048862 A1 | 2/2008 | Kritt et al. |
| 2008/0055087 A1 | 3/2008 | Horii et al. |
| 2008/0077511 A1 | 3/2008 | Zimmerman |
| 2008/0109114 A1 | 5/2008 | Orita et al. |
| 2008/0174432 A1 | 7/2008 | Ulrich |
| 2008/0203158 A1 | 8/2008 | Wieser |
| 2008/0232405 A1 | 9/2008 | Gallo |
| 2008/0246613 A1 | 10/2008 | Linstrom et al. |
| 2009/0033463 A1 | 2/2009 | Posamentier |
| 2009/0085721 A1 | 4/2009 | Dishongh |
| 2009/0121017 A1 | 5/2009 | Cato et al. |
| 2009/0121843 A1 | 5/2009 | Bauchot et al. |
| 2009/0167699 A1 | 7/2009 | Rosenblatt et al. |
| 2009/0245573 A1 | 10/2009 | Saptharishi et al. |
| 2010/0063652 A1 | 3/2010 | Anderson |
| 2010/0097195 A1 | 4/2010 | Majoros et al. |
| 2010/0114426 A1 | 5/2010 | Boss et al. |
| 2010/0123581 A1 | 5/2010 | Hatfield et al. |
| 2010/0271187 A1 | 10/2010 | Uysal et al. |
| 2010/0308964 A1 | 12/2010 | Ackley et al. |
| 2010/0328037 A1* | 12/2010 | Thomas et al. ............. 340/10.1 |
| 2011/0011936 A1 | 1/2011 | Morandi et al. |
| 2011/0163850 A1 | 7/2011 | Bachman et al. |
| 2011/0227748 A1 | 9/2011 | Schaible et al. |
| 2011/0266342 A1 | 11/2011 | Forster |
| 2011/0285506 A1 | 11/2011 | Hillis |
| 2012/0012655 A1* | 1/2012 | Kai et al. ..................... 235/439 |
| 2012/0126911 A1* | 5/2012 | Romanko ............ H01Q 1/2225 333/24.2 |
| 2012/0284132 A1 | 11/2012 | Kim et al. |
| 2013/0048724 A1* | 2/2013 | Burnside et al. ............ 235/385 |
| 2013/0076898 A1 | 3/2013 | Philippe et al. |
| 2013/0253700 A1 | 9/2013 | Carson et al. |
| 2013/0284806 A1 | 10/2013 | Margalit |
| 2014/0061303 A1 | 3/2014 | Brandi |
| 2014/0061382 A1 | 3/2014 | Tucker |
| 2014/0176307 A1 | 6/2014 | Forster |
| 2014/0279294 A1 | 9/2014 | Field-Darragh et al. |
| 2015/0019391 A1 | 1/2015 | Kumar et al. |
| 2015/0073907 A1 | 3/2015 | Purves et al. |

OTHER PUBLICATIONS

International Search Report and Written Opinion of PCT Application No. PCT/US2015/056779, dated Jan. 19, 2016.

Sample, A.P "A Capacitive Touch Interface for Passive RRID tags", 2009 IEEE International Conference on RFID, pp. 103-109.

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

Cristian Pop, "Introduction to the BodyCom Technology", Microchip AN1391, May 2, 2011, pp. 1-26, vol. AN1391, No. DS01391A, Publisher: 2011 Microchip Technology Inc.

* cited by examiner

ANTENNA EMBEDDED INVENTORY SHELF

CROSS-REFERENCE TO RELATED APPLICATION

This application claims priority to U.S. Provisional Application 62/013,513, filed Jun. 17, 2014, entitled "Efficient Monitoring of Inventory Items," which is incorporated herein by reference in its entirety.

BACKGROUND

Retailers, wholesalers, and other product distributors typically maintain an inventory of various items that may be ordered, purchased, leased, borrowed, rented, viewed, etc., by clients or customers. For example, an e-commerce website may maintain inventory in a fulfillment center. When a customer orders an item, the item is picked from inventory, routed to a packing station, packed and shipped to the customer. Likewise, physical stores maintain inventory in customer accessible areas (e.g., shopping area) and customers can locate items from within the store, pick the items from inventory and take them to a cashier for purchase, rental, etc.

It is often desirable to track inventory items at their location. Some fulfillment centers and/or physical stores may utilize barcodes, radio frequency identifier tags, etc., to track inventory within the facility.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
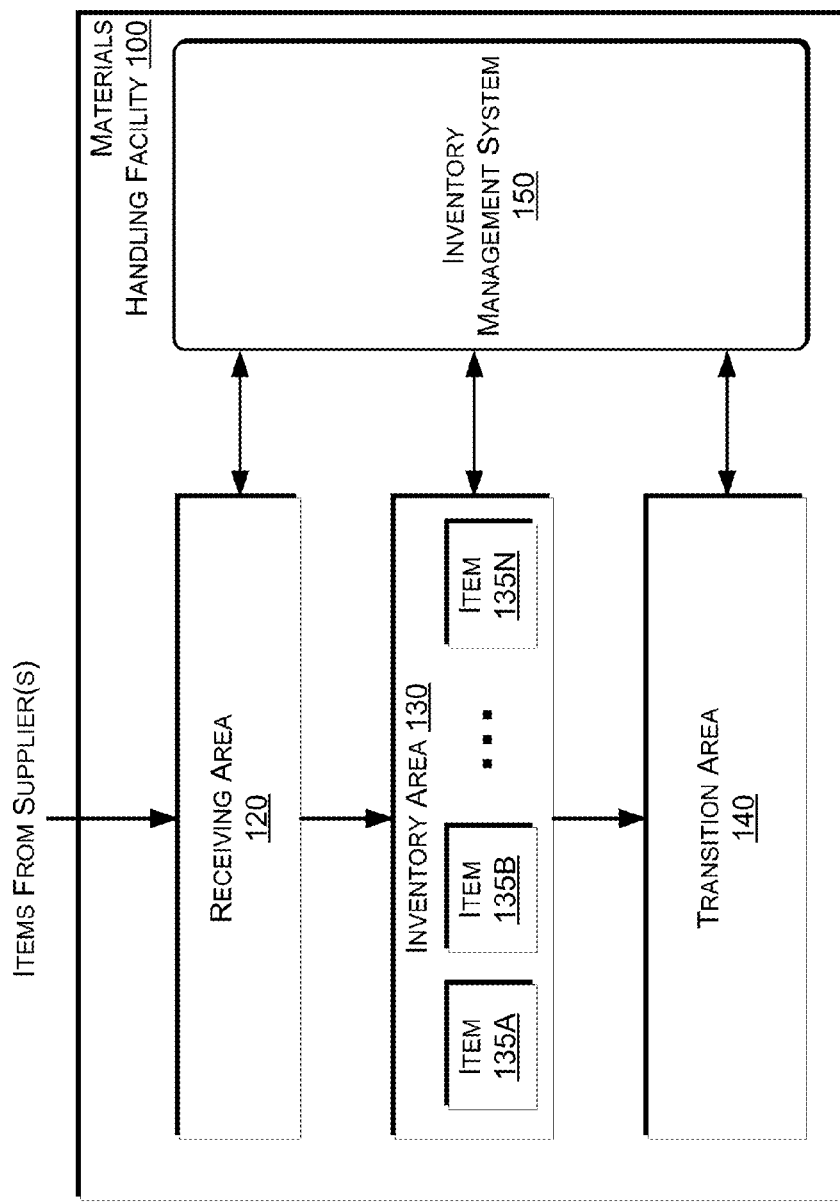
FIG. 1 is a block diagram illustrating a materials handling facility, according to one implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes the ability to efficiently track inventory using radio frequency identifier ("RFID") tags. For example, an inventory shelf located within a materials handling facility may include a series of antenna elements arranged along the shelf that communicate with an RFID reader. The antenna elements are configured to establish magnetic and/or electric fields oriented along at least a portion of the antenna element. The magnetic and electric fields can be used to read RFID tags included or attached to inventory items placed on the shelf. A multiplexer may also be utilized to enable the RFID reader to excite any combination of the antenna elements of the inventory shelf.

The RFID reader may utilize the antenna elements of the inventory shelf to perform an inventory mode to receive RFID tag identifiers from RFID tags located within a range of the antenna elements of the RFID reader. For example, during inventory mode, all antenna elements of a shelf may be excited and RFID tag identifiers received from RFID tags located on items positioned on the shelf.

The received RFID tag identifiers may be included in an inventory table associated with the antenna element. In a second mode, the RFID reader may perform a targeted read mode. During a targeted read mode, the RFID reader, utilizing one or more of the antenna elements, may issue a request for a selected RFID tag identified in the inventory table to reply to the request. If the RFID tag corresponding to the request responds, the RFID tag is determined to still be located within the range of the antenna element (e.g., on the portion of the shelf corresponding to the excited antenna element). If the RFID tag does not respond, the RFID tag may be determined to have been removed from within the range of the antenna element (e.g., removal of the inventory item that included the RFID tag). Removal of an RFID tag from a location is also referred to herein as a pick.

Utilizing a targeted read mode to poll RFID tags identified in an inventory table reduces the latency inherent in collision resolution protocols. For example, the UHF Gen2 RFID system uses the Frame Slotted ALOHA (or Dynamic Frame Slotted ALOHA) radio frequency protocol to identify tags within a range of an antenna element. The Frame Slotted ALOHA protocol often results in collisions from multiple tags reporting at the same time. When a collision occurs, the reader implements random back off and requires that both tags report again before they can be identified. This process continues until no collisions occur and all tags have reported.

With the implementations described herein, the RFID reader, having knowledge of the RFID tag identifiers (e.g., electronic product code ("EPC")), may utilize a masking feature to specify which tag is to respond to a request. When an RFID tag receives a request that includes a mask, it may determine if its tag identifier corresponds to the identifier in the mask and take a predetermined action based on the outcome of the comparison. For example, if the tag identifier matches the mask, the tag may respond to the request. If the tag identifier does not match the mask, the RFID tag may remain silent—not respond. In addition, to further reduce the potential for collision, the RFID reader may only send a request that includes a masking feature to the antenna element that previously identified the RFID tag that is to respond to the request.

In another implementation, the antenna elements and corresponding RFID reader may periodically be tuned to optimize the magnetic and electric fields generated by the antenna elements. When the inventory shelf is originally fabricated and installed in the materials handling facility, it may be coupled to an RFID reader and the antenna elements tuned by matching the impedance of the antenna element with the RFID reader to maximize forward power to the antenna elements and minimize or reduce reverse power received back from the antenna elements. However, due to the close proximity of the antennas to inventory items placed on the inventory shelf, the type and number of inventory items may have an effect on antenna performance by effectively altering the dielectric loading of the antenna element causing a detuning of the antenna element. In some implementations, the antenna element and connected RFID reader may be automatically tuned using a matching circuit in response to a pick or a place of an inventory item at an inventory shelf, a measured change in the return power from the antenna element, etc.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling.

An implementation of a materials handling facility configured to store and manage inventory items is illustrated in FIG. 1. As shown, a materials handling facility 100 includes a receiving area 120, an inventory area 130 configured to store an arbitrary number of inventory items 135A-135N, and one or more transition areas 140. The arrangement of the various areas within materials handling facility 100 is depicted functionally rather than schematically. For example, in some implementations, multiple different receiving areas 120, inventory areas 130 and transition areas 140 may be interspersed rather than segregated. Additionally, the materials handling facility 100 includes an inventory management system 150 configured to interact with each of receiving area 120, inventory area 130, transition area 140 and/or users within the materials handling facility 100.

The materials handling facility 100 may be configured to receive different kinds of inventory items 135 from various suppliers and to store them until a user orders or retrieves one or more of the items. The general flow of items through materials handling facility 100 is indicated using arrows. Specifically, as illustrated in this example, items 135 may be received from one or more suppliers, such as manufacturers, distributors, wholesalers, etc., at receiving area 120. In various implementations, items 135 may include merchandise, commodities, perishables, or any suitable type of item depending on the nature of the enterprise that operates the materials handling facility 100.

Upon being received from a supplier at receiving area 120, items 135 may be prepared for storage. For example, in some implementations, items 135 may be unpacked or otherwise rearranged, and the inventory management system 150 (which, as described below, may include one or more software applications executing on a computer system) may be updated to reflect the type, quantity, condition, cost, location or any other suitable parameters with respect to newly received items 135. It is noted that items 135 may be stocked, managed or dispensed in terms of countable, individual units or multiples of units, such as packages, cartons, crates, pallets or other suitable aggregations. Alternatively, some items 135, such as bulk products, commodities, etc., may be stored in continuous or arbitrarily divisible amounts that may not be inherently organized into countable units. Such items 135 may be managed in terms of measurable quantities such as units of length, area, volume, weight, time duration or other dimensional properties characterized by units of measurement. Generally speaking, a quantity of an item 135 may refer to either a countable number of individual or aggregate units of an item 135 or a measurable amount of an item 135, as appropriate.

After arriving through receiving area 120, items 135 may be stored within inventory area 130 on an inventory shelf. In some implementations, like items 135 may be stored or displayed together in bins, on shelves or via other suitable storage mechanisms, such that all items 135 of a given kind are stored in one location. In other implementations, like items 135 may be stored in different locations. For example, to optimize retrieval of certain items 135 having high turnover or velocity within a large physical facility, those items 135 may be stored in several different locations to reduce congestion that might occur at a single point of storage.

When a user order specifying one or more items 135 is received, or as a user progresses through the materials handling facility 100, the corresponding items 135 may be selected or "picked" from inventory area 130. For example, in one implementation, a user may have a list of items to pick and may progress through the materials handling facility picking items 135 from the inventory area 130. In other implementations, materials handling facility employees (referred to herein as users) may pick items 135 using written or electronic pick lists derived from orders. In some instances, an item may need to be repositioned from one location within the inventory area 130 to another location. For example, in some instances, an item may be picked from its inventory area, moved a distance and placed at another location.

Figure 2:
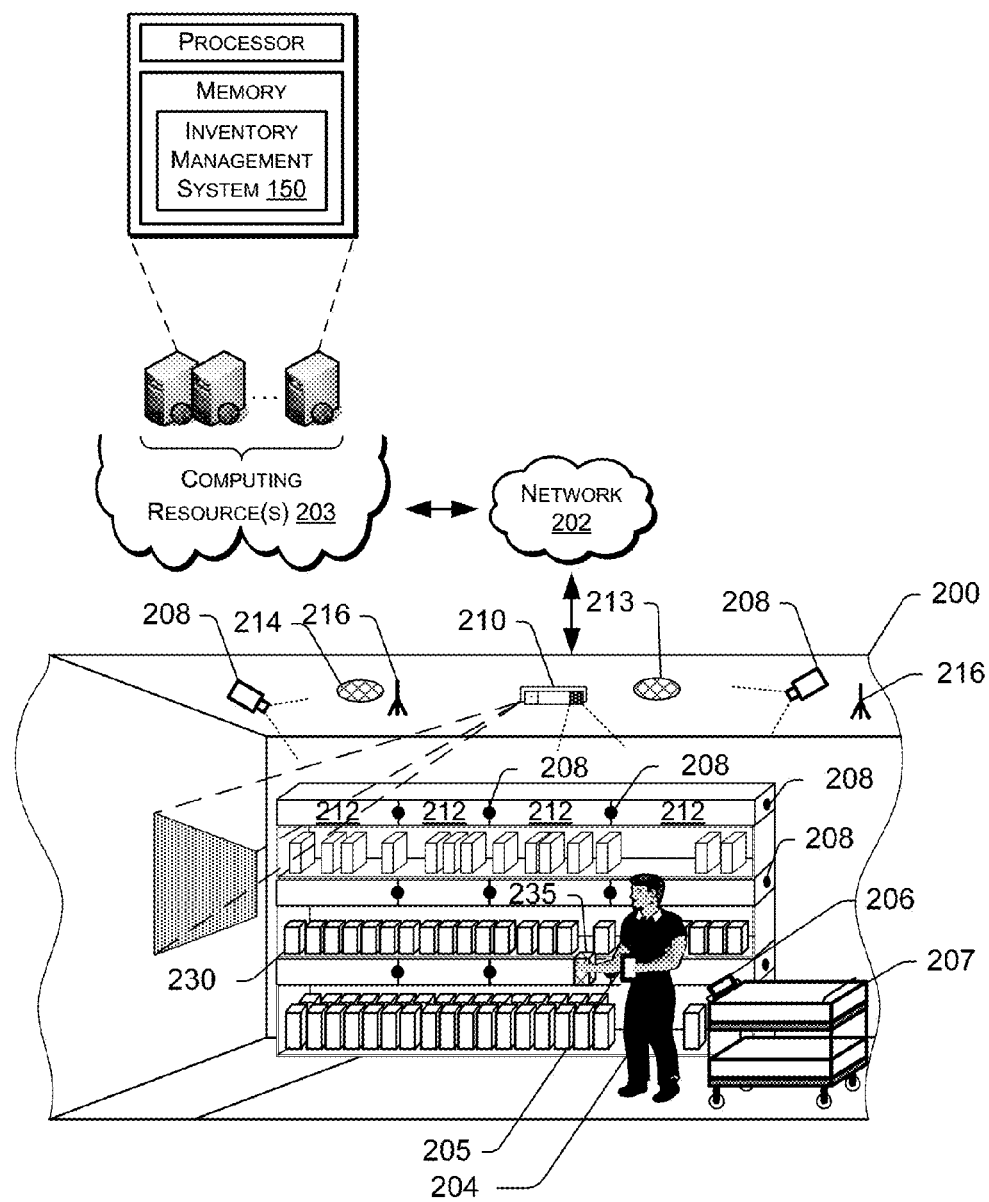
FIG. 2 shows additional components of the materials handling facility of FIG. 1, according to one implementation.

FIG. 2 shows additional components of a materials handling facility 200, according to one implementation. Generally, the materials handling facility 200 may include one or more image capture devices, such as cameras 208. For example, one or more cameras 208 may be positioned in locations of the materials handling facility 200 so that images of locations, items, and/or users within the materials handling facility can be captured. In some implementations, the image capture devices 208 may be positioned overhead, such as on the ceiling, to capture images of users and/or locations within the materials handling facility. In addition, in some implementations, one or more cameras 208 may be positioned on or inside of inventory areas. For example, a series of cameras 208 may be positioned on external portions of the inventory areas and positioned to capture images of users and/or the location surrounding the inventory area. Likewise, one or more cameras 208 may be positioned within the inventory areas to capture images of items stored in the inventory areas.

Any type of camera and/or configuration of cameras may be used with the implementations described herein. For example, one or more of the cameras may be RGB cameras, still cameras, motion capture/video cameras, etc. In other implementations, one or more of the cameras may be depth sensing cameras.

In addition to cameras, other input devices, such as pressure sensors, infrared sensors, scales, light curtains, load cells, RFID readers, etc., may be utilized with the implementations described herein. For example, a pressure sensor and/or a scale may be used to detect when an item is added and/or removed from inventory areas. Likewise, a light curtain may be positioned to cover the front of an inventory area and detect when an object (e.g., a user's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or an addition thereto, the inventory shelf may include one or more antenna elements coupled to an RFID reader that are configured to read RFID tags of items located on the inventory shelf. As described below, a list of RFID tag identifiers received from RFID tags coupled to items on the inventory shelf may be maintained and used to poll the RFID tags and confirm that they have not been removed.

An RFID tag generally refers to a device with an antenna or resonator that can produce a wireless signal when activated or powered. The wireless signal produced by the RFID tag is typically low power, and intended for transmission over short distances. The RFID tag may be formed of any material and may be flexible or rigid. In some implementations, the RFID tag may include an adhesive on a portion of the exterior of an RFID tag surface to enable attachment of the tag to an item, such as an inventory item. For example, an RFID tag may be an active RFID tag in which the RFID tag includes an internal power supply (e.g., battery), a passive RFID tag in which the RFID tag does not include a power supply and is activated by power supplied by an RFID reader, a battery-assisted RFID tag in which the RFID tag includes a power supply (battery) but is activated by power supplied by an RFID reader, an active near field communication ("NFC") tag, a passive NFC tag, a Bluetooth tag, or any other type of tag that can be configured to provide an identifier over a radio frequency. Likewise, an RFID reader, as used herein, refers to any type of RFID reader that can communicate with, interrogate and/or receive information from an RFID tag.

When the user 204 arrives at the materials handling facility 200, one or more images of the user 204 may be captured and processed. For example, the images of the user 204 may be processed to identify the user 204. This may be done using a variety of techniques, such as facial recognition, pattern matching, etc. In some implementations, rather than or in addition to processing images to identify the user, other techniques may be utilized to identify the user. For example, the user may provide an identification (e.g., user name, password), the user may present an identifier (e.g., identification badge, card), an RFID tag in the possession of the user may be detected, a visual tag (e.g., barcode, bokode, watermark) in the possession of the user may be detected, biometrics may be utilized to identify the user, etc.

The captured images and/or other inputs may also be used to establish a user pattern for the user 204 while located in the materials handling facility 200. The user pattern may identify an overall shape of the user 204 and/or any distinguishing features of the user 204 (e.g., color of shirt, height) that may be used to assist in the identification and/or tracking of the user 204 as they progress through the materials handling facility 200.

In some implementations, a user 204 located in the materials handling facility 200 may possess a portable device 205 and obtain information about items located within the materials handling facility 200, receive confirmation that the inventory management system 150 has correctly identified items that are picked and/or placed by the user, receive requests for confirmation regarding one or more event aspects, etc. Generally, the portable device 205 has at least a wireless module to facilitate communication with the inventory management system 150 and a display (e.g., a touch based display) to facilitate visible presentation to and interaction with the user 204. The portable device 205 may store a unique identifier and provide that unique identifier to the inventory management system 150 and be used to identify the user 204. In some instances, the portable device 205 may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 205 may operate in conjunction with or may otherwise utilize or communicate with one or more components of the inventory management system 150. Likewise, components of the inventory management system 150 may interact and communicate with the portable device 205 as well as identify the user 204, communicate with the user 204 via other means and/or communicate with other components of the inventory management system 150.

A tote 207 may also be associated with the user. The tote may be any form of apparatus configured to hold and/or carry items. For example, the tote 207 may be a bag, cart, trolley, etc. In some implementations, the tote 207 may include a device or display 206, which may be configured in a manner similar to the portable device 205. For example, the display 206 may include a touch-based display, a memory, processor, speakers, wireless network connectivity, etc. In other implementations, the tote 207 may include one or more embedded output devices. For example, the tote 207 may include illumination elements, speakers, actuators, etc., incorporated into the tote that may be activated using the implementations discussed herein.

As discussed further below, event information and/or user interfaces may be presented to the user via the portable device 205, the display 206 and/or any other output device located within the materials handling facility 200. Likewise, the portable device 205, the display 206 and/or any other input device located within the materials handling facility may be used to receive input from the user.

Generally, the inventory management system 150 may include one or more input/output devices, such as imaging devices (e.g., cameras) 208, projectors 210, displays 212, speakers 213, microphones 214, illumination elements (e.g., lights), etc., to facilitate communication between the inventory management system 150 and/or the user 204. In some implementations, multiple input/output devices may be distributed within the materials handling facility 200. For example, there may be multiple imaging devices, such as cameras located on the ceilings and/or cameras (such as pico-cameras) located in the aisles near the inventory items.

Likewise, the inventory management system 150 may also include one or more communication devices, such as wireless antennas 216, that facilitate wireless communication (e.g., Wi-Fi, Near Field Communication (NFC), Bluetooth) between the inventory management system 150 and the portable device 205. The inventory management system 150 may also include one or more computing resource(s) 203, such as a server system, that may be local to the environment (e.g., materials handling facility), remote from the environment, or any combination thereof.

The inventory management system 150 may utilize antennas 216 within the materials handling facility 200 to create a network 202 (e.g., Wi-Fi) so that the portable device 205 and/or display 206 can connect to and communicate with the inventory management system 150. Likewise, in instances when one or more of the components of the inventory management system 150 are remote from the materials handling facility 200, they may communicate with other components of the inventory management system 150 and/or the portable device 205 via the network 202. For example, when the user picks an item 235 from an inventory area 230, the inventory management system 150 may receive information, such as a load cell change, RFID tag identifier update, an image of the user, and/or an image of the performed action (item pick from the inventory area), identifying that an item has been picked from the inventory area 230. The event aspects (user identity, action performed, item involved in the event) may then be determined and the inventory management system 150 may send a user interface and/or information to the portable device 205 for presentation to the user 204.

Figure 3:
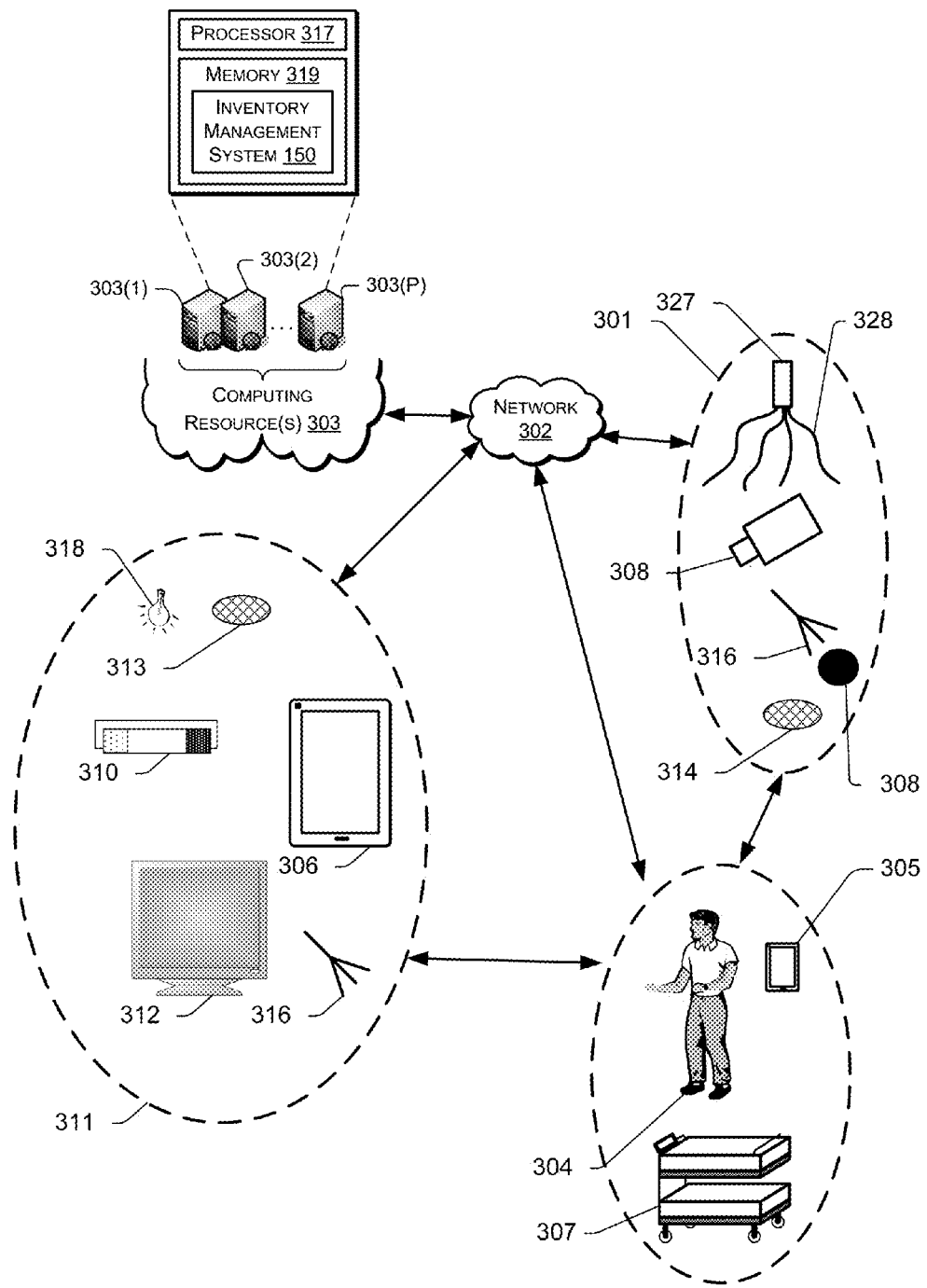
FIG. 3 shows components and communication paths between component types utilized in a materials handling facility of FIG. 1, according to one implementation.

FIG. 3 shows example components and communication paths between component types utilized in a materials handling facility 100, in accordance with one implementation. A portable device 305 may communicate and interact with various components of an inventory management system 150 over a variety of communication paths. Generally, the inventory management system 150 may include input components 301, output components 311 and computing resource(s) 303. The input components 301 may include an imaging device 308, microphone 314, antenna 316, a RFID reader 327 with one or more antenna elements 328, or any other component that is capable of receiving input about the surrounding environment and/or from the user. The output components 311 may include a projector 310, a portable device 306, a display 312, an antenna 316, a radio (not shown), speakers 313, illumination elements 318 (e.g., lights), and/or any other component that is capable of providing output to the surrounding environment and/or the user.

The inventory management system 150 may also include computing resource(s) 303. The computing resource(s) 303 may be local to the environment (e.g., materials handling facility), remote from the environment, or any combination thereof. Likewise, the computing resource(s) 303 may be configured to communicate over a network 302 with input components 301, output components 311 and/or directly with the portable device 305, the user 304 and/or the tote 307.

As illustrated, the computing resource(s) 303 may be remote from the environment and implemented as one or more servers 303(1), 303(2), . . . , 303(P) and may, in some instances, form a portion of a network-accessible computing platform implemented as a computing infrastructure of processors, storage, software, data access, and so forth that is maintained and accessible by components/devices of the inventory management system 150 and/or the portable device 305 via a network 302, such as an intranet (e.g., local area network), the Internet, etc. The server system 303 may process images of users 304 to identify the user 304, process images of items to identify items, determine a location of items and/or determine a position of items. The server system(s) 303 does not require end-user knowledge of the physical location and configuration of the system that delivers the services. Common expressions associated for these remote computing resource(s) 303 include "on-demand computing," "software as a service (SaaS)," "platform computing," "network-accessible platform," "cloud services," "data centers," and so forth.

Each of the servers 303(1)-(P) include a processor 317 and memory 319, which may store or otherwise have access to an inventory management system 150, which may include or provide image processing (e.g., for user identification, expression identification, and/or item identification), inventory tracking, and/or location determination.

The network 302 may utilize wired technologies (e.g., wires, USB, fiber optic cable, etc.), wireless technologies (e.g., radio frequency, infrared, NFC, cellular, satellite, Bluetooth, etc.), or other connection technologies. The network 302 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies.

Figure 4A:
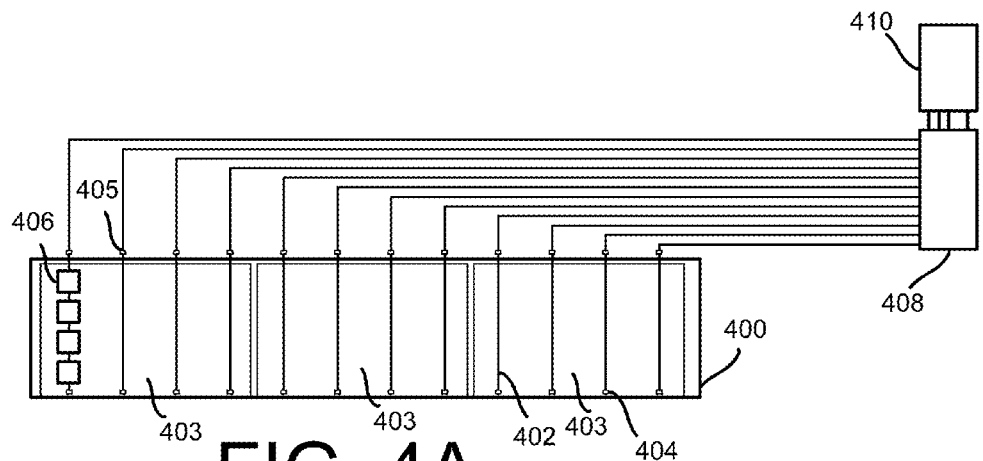
FIGS. 4A-4C are diagrams illustrating an antenna embedded inventory shelf, according to one implementation.

FIG. 4A is a top-down illustration of an antenna embedded inventory shelf 400, according to an implementation. The antenna embedded inventory shelf 400 includes a plurality of antenna elements 402 positioned along the antenna embedded inventory shelf 400. For example, two or more of the antenna elements 402 may be substantially parallel to each other and extend from the rear or back of the substrate toward the front of the substrate. In this example, there are twelve antenna elements 402. In other implementations, there may be fewer or additional antenna elements 402 included in the antenna embedded inventory shelf 400.

The spacing or separation between the antenna elements may be uniform across the antenna embedded inventory shelf 400 and/or may vary based on the size, type and/or number of inventory items 406 that may be placed on the antenna embedded inventory shelf 400. For example, the antenna elements may be spaced between approximately two inches and approximately six inches to accommodate different sizes of inventory items 406. In other implementations, the antenna elements may be included in a prefabricated sheet or set of antenna elements, such as antenna element sheets 403, each of which include four equally spaced antenna elements. The antenna element sheets may be placed adjacent to one another along the antenna embedded inventory shelf 400. To vary antenna element spacing along the antenna embedded inventory shelf 400, antenna element sheets having antenna elements with different spacings may be placed one the antenna embedded inventory shelf 400.

In one implementation, the antenna elements 402 are positioned on the antenna embedded inventory shelf 400 so that items placed on the antenna embedded inventory shelf 400 are positioned above each antenna element. For example, each row of inventory items 406 may be positioned over an antenna element 402. By positioning the inventory items over the antenna elements 402, RFID tags attached to or included in the inventory items may be energized by an antenna element 402. In some implementations, as discussed further below, when an antenna element and/or RFID reader receives an RFID tag identifier from an RFID tag, it may associate the RFID tag identifier with the receiving antenna element. For example, each antenna element may include a unique position on the antenna embedded inventory shelf 400 and/or have a corresponding unique identifier. When the RFID tag identifier is received and added to the inventory table, the corresponding antenna location and/or antenna unique identifier may be associated with the RFID tag identifier and stored in the inventory table. Associating the RFID tag identifier and the antenna location and/or antenna unique identifier provides both location information for the inventory item associated with the RFID tag identifier and identifies the antenna element 402 that is to be excited to poll the RFID tag.

The antenna elements may be any type of antenna element capable of generating a field that can be used to energize an RFID tag so that communication with the RFID tag is enabled. For example, each antenna element may be a planar radiating transmission line. In other implementations, the antenna element may be another form of antenna, such as an omnidirectional antenna. In some implementations, the antenna elements may be configured to operate in both near field mode and far field mode. In near field, or magnetic mode, the magnetic fields generated by the antenna elements may be used to excite RFID tags within the field and read RFID tag identifiers stored on those RFID tags. For example, near field RFID tags may be placed in close proximity to the antenna elements by affixing them to the base of items. The near field RFID tags rely on magnetic coupling between the field of the antenna element and an RFID tag antenna to close the communication link so that the RFID tag identifier of the RFID tag can be read. Near field or magnetic mode is beneficial when dealing with items that are liquid filled, have a high dielectric constant or are a combination of both. Near field mode is also advantageous when a well-defined, constrained read zone is desired. This is due to the magnetic field strength falling off quickly with distance from the antenna element. In far field, or electric mode, far field tags within the field of the antenna element may also be excited and read.

Each antenna element may be terminated by a load resistor 404 in the characteristic impedance of the antenna element to reduce standing waves and improve the uniformity of field coverage of the field generated by the antenna element 402. The opposing end of each antenna element may, likewise, be coupled to a multiplexer 408. The multiplexer is coupled to and controlled by an RFID reader 410 that is configured to energize the antenna elements 402 and may be utilized with the implementations discussed herein. For example, the RFID reader 410 may control the multiplexer 408 to select one or more antenna elements 402 to energize to perform a targeted read mode, as discussed below. In another example, the RFID reader 410 may control the multiplexer 408 to select and energize all of the antenna elements 402 to perform an inventory read mode, as discussed below.

The RFID reader may receive instructions from the inventory management system to perform the operations discussed herein. For example, the inventory management system 150 may send instructions to the RFID reader to scan for RFID tag identifiers. In response, the RFID reader will scan for RFID tag identifiers using an antenna element and provide the received RFID tag identifiers to the inventory management system. The inventory management system may likewise send other instructions to the RFID reader, such as those discussed below with respect to FIGS. 5-8.

While the example configuration illustrated in FIG. 4A identifies the multiplexer 408 as separate from the RFID reader 410, in other implementations, the multiplexer may be incorporated into the RFID reader 410.

In some implementations, each antenna element 402 may also include a matching circuit 405. The matching circuit may be used to determine the return power of the antenna element and/or to dynamically tune the antenna element, as discussed further below with respect to FIG. 8. In some implementations, the matching circuit 405 may include adjustable capacitors and fixed inductors that can be adjusted to dynamically modify the impedance of the antenna element 402.

Figure 4B:
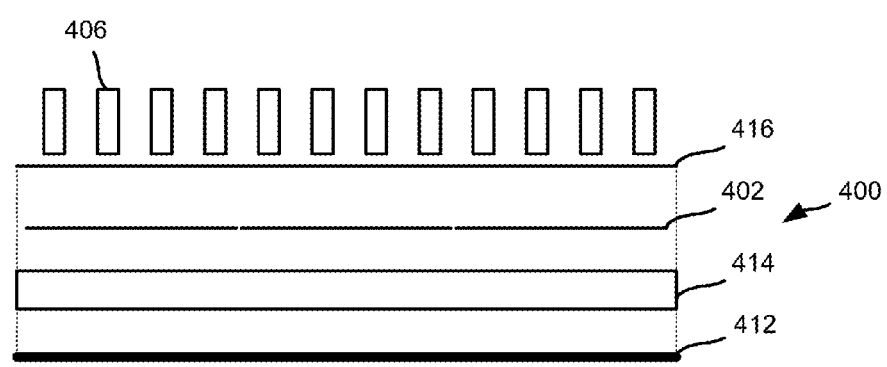

FIG. 4B is cross sectional view of the antenna embedded inventory shelf 400, which each component of the antenna embedded inventory shelf separated for purposes of illustration, according to an implementation. In the illustrated implementation, the antenna embedded inventory shelf 400 includes a ground plane 412, a substrate 414, antenna elements 402 and a protective cover 416. The ground plane 412 may be formed of any conductive material that can provide a common ground for the antenna embedded inventory shelf 400. The ground plane may be formed of any conductive material, such as metal, and may be of any thickness.

In one implementation, the ground plane 412 is shelf of a standard gondola shelf system. A gondola shelf system typically includes a flat base and a vertical component featuring notches, pegboards, or slatwalls. The vertical pieces are fitted with shelves, such as metal shelves, to support inventory items. Gondolas placed end-to-end can form rows of shelving. For example, an existing gondola shelf system located in a materials handling facility can be converted into an antenna embedded inventory shelf 400 by utilizing the existing gondola shelf as the ground plane 412 of the antenna embedded inventory shelf 400.

Adjacent to the ground plane 412 is a substrate 414 formed from a material having a low dielectric constant with respect to other materials. The substrate 414 may be coupled to the ground plane (permanently or temporarily), removably placed on the ground plane, etc. For example, if the ground plane is a metal shelf, the substrate 414 may be placed on the shelf. The substrate 414 may be formed of any low dielectric constant material, such as, but not limited to, acrylonitrile butadiene styrene ("ABS"), polystyrene, polyvinyl chloride ("PVC"), high-density polyethylene ("HDPE"), low-density polyethylene ("LDPE"), etc. The substrate is configured to improve the field above the antenna embedded inventory shelf 400 generated by the antenna elements 402 and to prevent or reduce field below the antenna embedded inventory shelf 400. The substrate 414 is of a sufficient thickness to provide support to the antenna embedded inventory shelf 400 and improve the field above the antenna embedded inventory shelf 400. Generally, the substrate 414 may be at least approximately one-quarter of an inch thick. In one implementation, the substrate is approximately three-eighths of an inch thick.

Each of the antenna elements 402 are embedded into the top of the substrate 414, placed onto the top of the substrate 414, and/or affixed to the top of the substrate 414. For example, the antenna elements may be provided in fabricated sheets 403 with an adhesive back that are affixed to the top of the substrate 414. In other implementations, the antenna elements may be incorporated into printed circuits, provided as adhesive copper tape, etc., that are affixed to the top of the substrate 414. In still other implementations, the substrate 414 may be cut or etched and the antenna elements 402 incorporated into the top of the substrate 414. In the example illustrated in FIGS. 4A-4C, the antenna elements 402 are incorporated into fabricated sheets 403 that are affixed to the top of the substrate 414.

Finally, a protective cover 416 is affixed over the top of the antenna elements 402 and/or substrate 414 to provide a protective surface between the antenna elements 402 and inventory items that are placed onto the inventory shelf. The protective cover 416 may be formed of any material. In some implementations, the protective cover 416 is formed of the same material as the substrate 414. For example, the protective cover may be ABS, polystyrene, PVC, HDPE, LDPE, etc. The protective cover 416 may be any thickness sufficient to protect the antenna elements 402. For example, in some implementations, the protective cover 416 is approximately one-sixteenth of an inch thick.

In some implementations, the protective cover 416 may be formed of a porous plastic that is approximately 50% plastic and 50% air to provide a separation between the antenna elements 402 and the inventory items 406. For example, the protective cover 416 may be approximately one-quarter of an inch thick. Separating the antenna elements 402 and the inventory items 406 using a porous plastic protective cover 416 reduces detuning caused by the inventory items. While this example describes the use of a porous plastic, in other implementations, other materials may likewise be utilized.

Figure 4C:
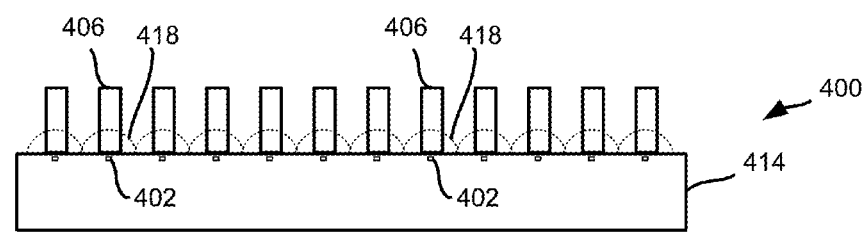

FIG. 4C is a side view of an antenna embedded inventory shelf 400, according to an implementation. As illustrated, when an antenna element 402 is excited, it generates a field 418, such as a magnet field or an electric field. For example, the antenna element 402 may generate a magnetic field for use in reading RFID tags. By positioning the antenna elements 402 along the shelf, inventory items 406 may be placed in rows on the shelf and the RFID tags attached to the inventory items 406 will be located in at least one field generated by the antenna elements 402 so that the RFID tag can be read and the item identified.

Utilization of the substrate 414 promotes the field 418 generated by the antenna elements 402 in a direction above the antenna embedded inventory shelf 400 and hinders propagation of the field below the antenna embedded inventory shelf 400, thereby reducing or prohibiting the reading of RFID tags located below the antenna embedded inventory shelf 400.

The fields 418 generated by the antenna elements 402 may have a footprint between approximately one inch and approximately six inches. Likewise, the antennas may be positioned or tuned so that the fields 418 generated by the antenna elements 402 overlap, to prevent locations on the antenna embedded inventory shelf 400 where an RFID tag is not readable by at least one antenna element 402.

Figure 5:
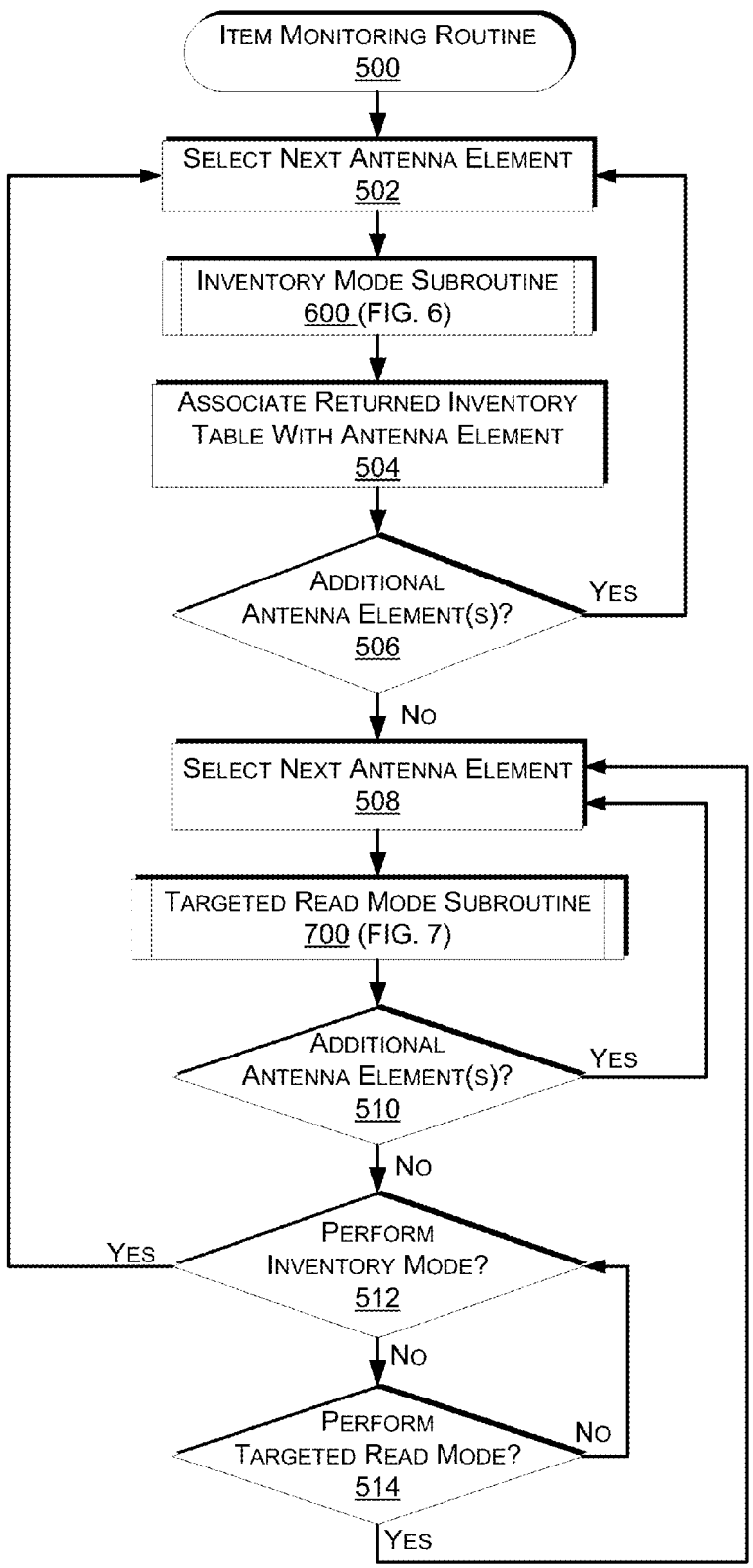
FIG. 5 is a flow diagram of an example item monitoring routine, according to one implementation.

FIG. 5 is a flow diagram of an example item monitoring routine 500, according to one implementation. The example routine of FIG. 5, and each of the other routines discussed herein, may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example item monitoring routine 500 begins by selecting an antenna element of an RFID reader, as in 502. In some implementations, an RFID reader may include one or more antenna elements, such as a set of antenna elements of an antenna embedded inventory shelf. Each antenna element may be associated with an inventory table maintained in a data store identifying RFID tag identifiers (such as EPCs) for RFID tags within a range of the antenna element. In other implementations, the RFID reader may maintain a single inventory table for all RFID tag identifiers received by all corresponding antenna elements of the RFID reader. In such an implementation, the inventory table may also identify the antenna element that received each RFID tag identifier.

Upon selecting an antenna element, the inventory mode subroutine 600 is performed. The inventory mode subroutine 600 is discussed in further detail below with respect to FIG. 6. Upon completion of the inventory mode subroutine 600, an inventory table for the selected antenna element is returned and the returned inventory table is associated with the antenna element, as in 504. The association may be maintained by the inventory management system in one or more data stores.

A determination may also be made as to whether there are additional antenna elements for which the inventory mode is to be performed, as in 506. For example, if the RFID reader includes multiple antenna elements, the inventory mode may be performed for each antenna element. In other implementations, the inventory mode may only be performed for some of the antenna elements associated with an RFID reader.

If it is determined that the inventory mode is to be performed for another antenna element, the example routine 500 returns to block 502 and continues. However, if it is determined that there are no additional antenna elements for which inventory mode is to be performed, an antenna element for which targeted read mode is to be performed is selected, as in 508. Targeted read mode may be performed periodically, a set number of times and/or based on input from other components of the materials handling facility. For example, if a load cell or sensor of an inventory location associated with the antenna element provides a notification that a weight has decreased (representative of an item pick), the targeted read mode may be performed for the inventory table associated with the corresponding antenna element.

Upon selection of an antenna element, the targeted read mode subroutine 700 is performed with respect to the inventory table associated with the selected antenna element, as in 700. The targeted read mode subroutine 700 is discussed further below with respect to FIG. 7. Upon completion of the targeted read mode, any items determined to be picked are identified and a notification may be provided to one or more users. For example, a user that is adjacent the inventory location may receive a notification confirming an identity of a picked item.

A determination may also be made as to whether the targeted read mode subroutine 700 is to be performed with respect to any other antenna element, as in 510. If the targeted read mode subroutine 700 is to be performed with respect to another antenna element, the example routine 500 returns to block 508, the next antenna element is selected, and the example routine 500 continues. However, if it is determined that the targeted read mode subroutine is not to be performed with respect to another antenna element, a determination is made as to whether the inventory mode is to be performed again with respect to any of the antenna elements, as in 512. Likewise, a determination may be made as to whether the targeted read mode is to be performed with respect to any other antenna elements, as in 514.

Switching between targeted read mode and inventory mode may be done periodically and/or in response to other events occurring within the materials handling facility. In some implementations, inventory mode and/or targeted read mode may be terminated or the frequency of performance decreased until an event occurs near an antenna element. For example, the inventory mode and targeted read mode may only be performed with a low recurrence (e.g., once every 10 minutes) unless there is another event (e.g., user detection near an antenna element). If another event is detected, the inventory mode and/or targeted read mode may be performed.

Figure 6:
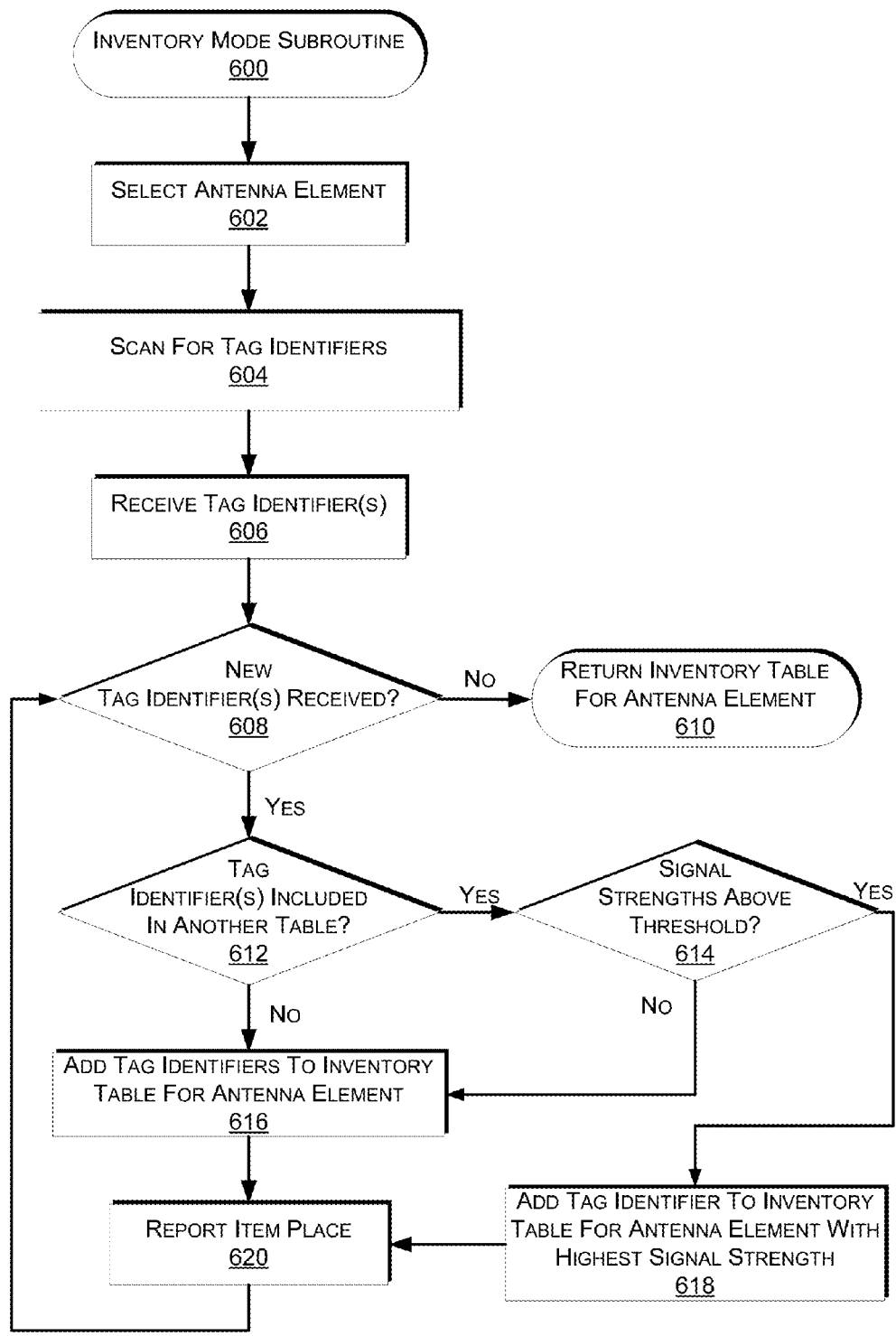
FIG. 6 is a flow diagram of an example inventory mode subroutine, according to one implementation.

FIG. 6 is a flow diagram of an inventory mode subroutine 600, according to an implementation. The inventory mode subroutine 600 begins by selecting an antenna element, as in 602. Upon selection of an antenna element, the selected antenna element is used to scan for RFID tags within range of the antenna element, as in 604. Scanning for RFID tags may be done using typical RFID tag scanning protocols, such as collision resolution protocols. As tags report and provide their RFID tag identifier (EPC), the example routine receives the tag identifiers, as in 606.

As each tag identifier is received, a determination is made as to whether the received tag identifier is new or already identified on an inventory table associated with the antenna element, as in 608. As discussed above, an inventory table may be associated with each antenna element and used to maintain a list of RFID tag identifiers detected by an antenna element. If it is determined that there are no new RFID tag identifiers received by the antenna element, the inventory table for the antenna element is returned, as in 610.

However, if it is determined that a RFID tag identifier is not already present on the inventory table associated with the antenna element that received the RFD tag identifier, a determination is made as to whether the RFID tag identifier is included on another inventory table and/or associated with another antenna element, as in 612. If it is determined that the RFID tag identifier is associated with another antenna element and/or identified on another inventory table, a determination is made as to whether the signal strength corresponding to one or more of the antenna elements that received the RFID tag identifier is above a threshold, as in 614. The threshold may be any defined value or amount and may be different for different antenna elements, different locations within the materials handling facility, different items, etc.

If it is determined that the signal strengths of the antenna elements that received the RFID tag identifier are not above the threshold, or if it is determined that the received RFID tag is not identified on another inventory table or associated with another antenna element, the RFID tag identifier is added to the inventory table associated with the antenna element, as in 616. If it is determined at decision block 614 that the signal strength of one of the antenna elements that received the RFID tag identifier does exceed the threshold, the RFID tag identifier is added to the inventory table associated with the antenna element having the highest signal strength for receiving the RFID tag identifier.

After adding the RFID tag identifier to an inventory table in block 616 or block 618, the example subroutine reports an item place for an item associated with the detected RFID tag identifier, as in 620. An item place may represent the addition of an item that includes the RFID tag identifier at a location that is within range of the field of the antenna element. In some implementations, the item place may identify the antenna element, the location within the materials handling facility corresponding to the antenna element, the received RFID tag identifier, a signal strength at the antenna when the RFID tag identifier is received, a time at which the RFID tag identifier was received, etc. After reporting an item place, the example subroutine 620 returns to block 608 and continues.

Figure 7:
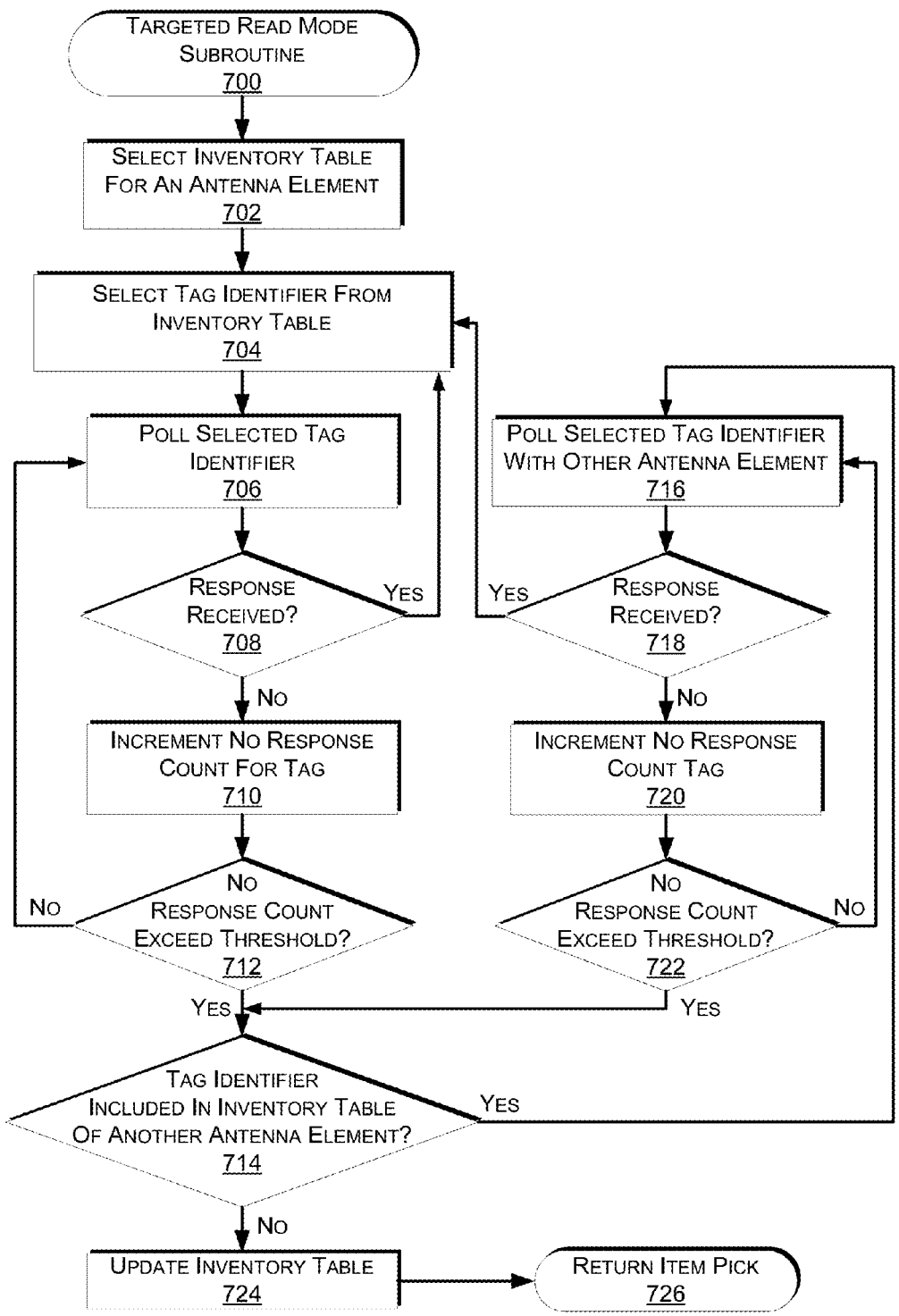
FIG. 7 is a flow diagram of an example targeted read mode subroutine, according to one implementation.

FIG. 7 is a flow diagram of an example targeted read mode subroutine 700. The example subroutine 700 begins by selecting an inventory table for an antenna element, as in 702. As discussed above, separate inventory tables identifying RFID tag identifiers may be maintained for each antenna element of an RFID reader. In other implementations, the RFID reader may maintain an inventory table for all antenna elements associated with the RFID reader and maintain an association between the received RFID tag identifiers and the antenna elements that received the RFID tag identifiers.

For a selected inventory table associated with an antenna element, an RFID tag identifier is selected, as in 704. For a selected RFID tag identifier, the example subroutine 700 utilizes the corresponding antenna element to poll the RFID tag to determine if the RFID tag is still within the range of the antenna element, as in 706. Polling may be enabled by masking the data packets transmitted by the antenna element. For example, in Gen2 RFID systems, a masking feature may be included in a packet (e.g., query packet, select packet). The RFID tags may be configured to read the information in the mask, compare the information with stored information and perform a defined action based on the comparison. For example, the RFID tag identifier may be included in the mask. Receiving RFID tags may compare the RFID tag identifier included in the mask with their own RFID tag identifier. If the RFID tag identifier of the mask corresponds to the RFID tag identifier stored by the RFID tag, the RFID tag may provide a response (defined task). If the RFID tag identifiers do not match, the RFID tag may not respond.

This process of targeted read mode eliminates collisions of multiple tags reporting at the same time, thereby reducing the latency inherent in existing systems.

After polling a selected RFID tag, a determination is made as to whether the RFID tag has responded, as in 708. If it is determined that the RFID tag has responded, the example subroutine 700 returns to block 704 and continues. However, if no response is received after a defined period of time, a no response count for the RFID tag identifier is incremented, as in 710. After incrementing the no response count for the RFID tag, a determination is made as to whether the no response count for the RFID tag exceeds a count threshold, as in 712. The count threshold may be any defined number of retries that are to be performed by the example subroutine. For example, the count may be set to five, such that five attempts or polls are made for the selected RFID tag before the count threshold is exceeded for the selected RFID tag.

If it is determined that the count threshold has not been exceeded for the RFID tag, the example subroutine 700 returns to block 706 and continues. However, if it is determined that the count has been exceeded, a determination is made as to whether the RFID tag identifier is associated with another antenna element and/or identified in another inventory table, as in 714. If it is determined that the RFID tag identifier is included in another inventory table and/or associated with another antenna element, the other antenna element is used to poll the RFID tag, as in 716. Polling using another antenna element may be done as discussed above with respect to block 706.

Similar to blocks 708-712, after polling the RFID tag using another antenna element, a determination is made as to whether a response is received, as in 718. If a response is received, the example subroutine returns to block 704 and continues. If a response is not received, the no response count is incremented, as in 720, and a determination is made as to whether the no response count for the RFID tag from that antenna element exceeds a threshold, as in 722. If the no response count does not exceed the threshold, the example subroutine 700 returns to block 716 and continues. The count threshold for additional antenna elements may be the same or different than the count threshold for other antenna elements.

If it is determined that the count threshold has been exceeded at decision block 722, the example subroutine 700 returns to decision block 714 and continues. If it is determined at decision block 714 that the RFID tag identifier is not associated with another antenna element and/or another inventory table, the inventory table is updated to remove the RFID tag identifier from the inventory table, as in 724. In addition, an item pick may be returned, as in 726. An item pick may be an identification that an item that was associated with the RFID tag that is no longer detected has been picked or removed from the location within the range of the antenna element. The pick may identify, for example, the antenna element, the location within the materials handling facility associated with the antenna element, a time at which the RFID tag was determined to no longer be present, the RFID tag identifier, etc.

Figure 8:
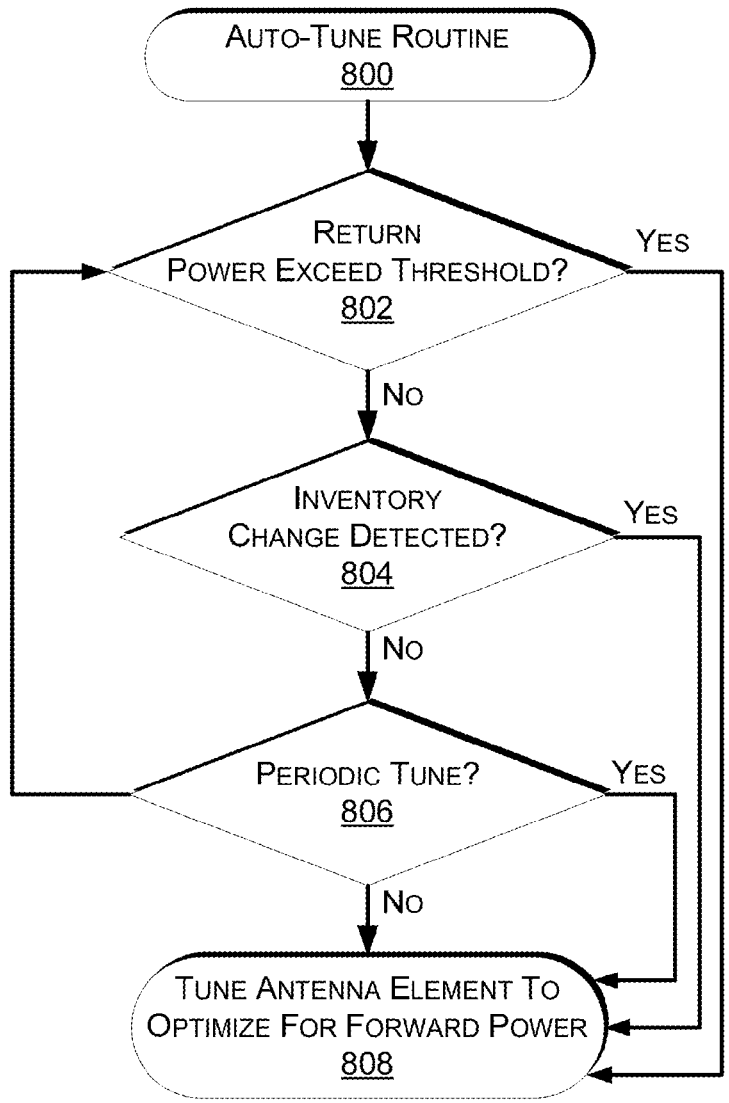
FIG. 8 is a flow diagram of an example auto-tune routine, according to one implementation.

FIG. 8 is a flow diagram of an auto-tune process 800 for tuning an antenna element, according to an implementation. As discussed above, an antenna element of an antenna embedded inventory shelf 400 may effectively become detuned due to a change in dielectric loading of the antenna element resulting from the addition and/or removal of items in close proximity to the antenna element (e.g., items placed or picked from the antenna embedded inventory shelf).

The example auto-tune routine 800 begins by determining if the return power from an antenna element exceeds a threshold, as in 802. The threshold may be any defined amount. In some implementations, the threshold may be zero and, if any return power is detected, the antenna element may be tuned. In other implementations, the threshold may be exceeded if the return power is more than five percent of the forward power to the antenna element.

If it is determined that the return power exceeds a threshold, the antenna element is tuned to optimize for forward power, as in 808. Tuning may be accomplished with a matching circuit that utilizes adjustable capacitors and fixed inductors. The matching circuit may be positioned between the antenna element and the RFID reader and adjusted by the processor that controls the RFID reader. For example, the forward power and the return power may be read by the RFID reader and the matching circuit adjusted to maximize the forward power and minimize return power. For example, a characteristic of the matching circuit may be altered by adjusting the adjustable capacitors, which in turn alters the impedance of the antenna element. The matching circuit may be adjusted so that the impedance of the antenna element corresponds with the impedance of the RFID reader.

While matching circuits are typically utilized to allow antenna operation over a wide frequency range, in the implementations discussed herein, the matching circuit is used to alter the impedance of the antenna element in response to changes to the antenna element—e.g., the dielectric loading of the antenna element changing in response to inventory items being added and/or removed from a shelf that includes the antenna element.

If it is determined that the return power does not exceed the threshold, a determination is made as to whether an inventory change at the antenna element has been detected, as in 804. An inventory change, such as an item place or an item pick, may be determined using the implementations discussed herein. For example, an item place may be determined when a new RFID tag is detected by the antenna element. Likewise, an item pick may be determined when an RFID tag is no longer readable by the antenna element.

If an inventory change 804 has been detected, the antenna element is tuned, as in 808. However, if no inventory change has been detected, it may be determined whether the antenna element is to be tuned according to a periodic tuning, as in 806. For example, the example auto-tune routine 800 may periodically tune the antenna element during periods of inactivity, after a defined period of time has expired since the last tuning of the antenna element, at defined times, etc. For example, the example auto-tune routine 800 may tune the antenna element at least once every twenty-four hours. If it is determined that the antenna element is to be tuned according to a periodic tuning, the antenna element is tuned, as in 808. If the antenna element is not to be tuned according to a periodic tuning, the example auto-tune routine 800 returns to block 802 and continues.

Figure 9:
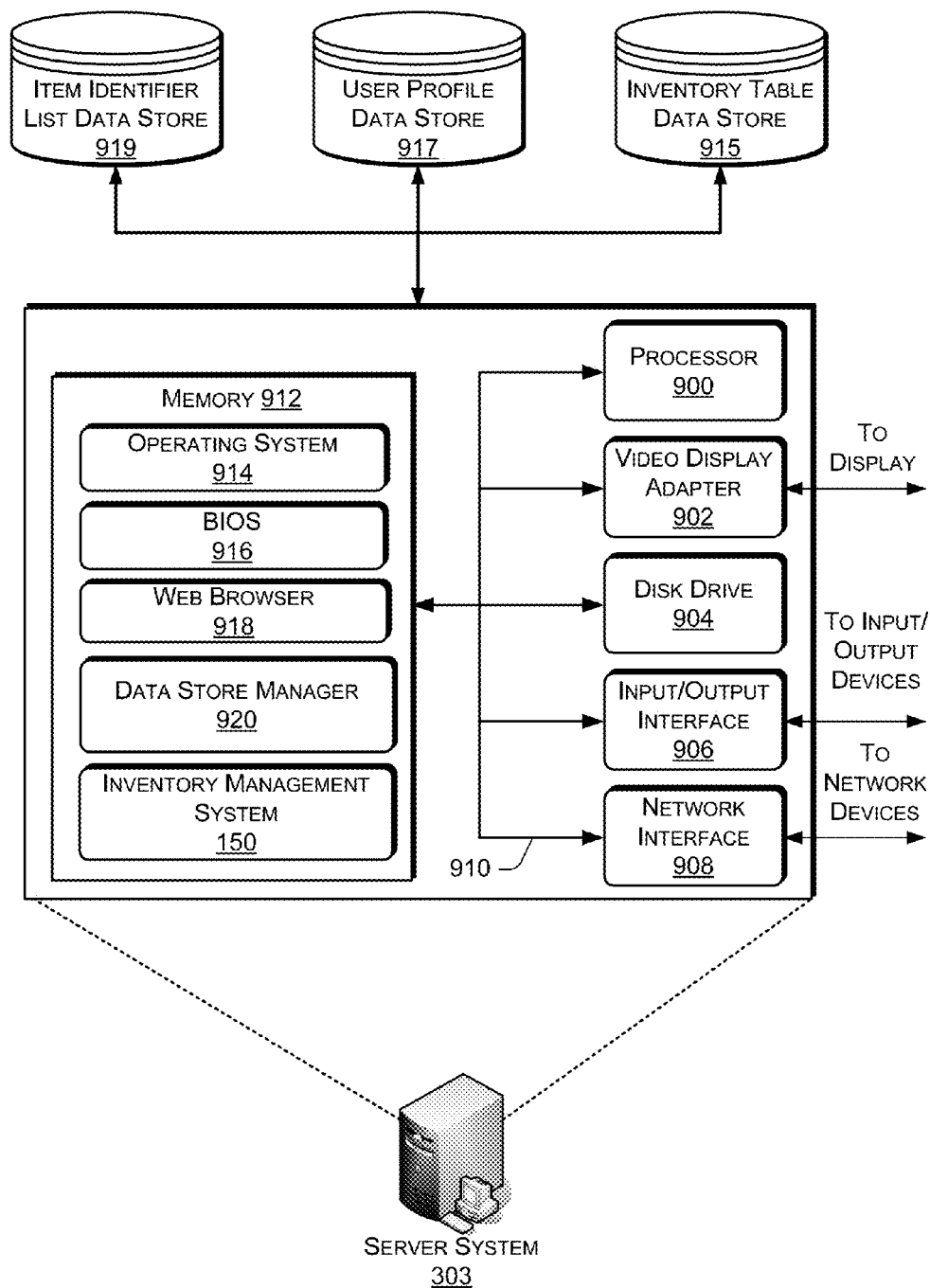
FIG. 9 is a block diagram of an illustrative implementation of a server system that may be used with various implementations.

FIG. 9 is a pictorial diagram of an illustrative implementation of a server system, such as the server system 303, that may be used in the implementations described herein. The server system 303 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display (not shown in FIG. 9) permitting an operator of the server system 303 to monitor and configure operation of the server system 303. The input/output interface 906 likewise communicates with external input/output devices not shown in FIG. 9, such as a mouse, keyboard, scanner, or other input and output devices that can be operated by an operator of the server system 303. The network interface 908 includes hardware, software, or any combination thereof, to communicate with other computing devices. For example, the network interface 908 may be configured to provide communications between the server system 303 and other computing devices via the network 302, as shown in FIG. 3.

The memory 912 generally comprises random access memory (RAM), read-only memory (ROM), flash memory, and/or other volatile or permanent memory. The memory 912 is shown storing an operating system 914 for controlling the operation of the server system 303. A binary input/output system (BIOS) 916 for controlling the low-level operation of the server system 303 is also stored in the memory 912.

The memory 912 additionally stores program code and data for providing network services that allow the inventory management system 150 to identify users and/or items within the materials handling facility. Accordingly, the memory 912 may store a browser application 918. The browser application 918 comprises computer executable instructions, that, when executed by the processor 900, generate or otherwise obtain configurable markup documents such as Web pages. The browser application 918 communicates with a data store manager application 920 to facilitate data exchange between the inventory table data store 915, the user profile data store 917 and/or the item identifier list data store 919.

As used herein, the term "data store" refers to any device or combination of devices capable of storing, accessing and retrieving data, which may include any combination and number of data servers, databases, data storage devices and data storage media, in any standard, distributed or clustered environment. The server system 303 can include any appropriate hardware and software for integrating with the data stores 915-919 as needed to execute aspects of the inventory management system 150.

The data stores 915-919 can include several separate data tables, databases or other data storage mechanisms and media for storing data relating to a particular aspect. For example, the data stores 915-919 illustrated include mechanisms for maintaining inventory information (e.g., item locations, images of item when properly positioned, item features), user profile information, item lists associated with users, inventory tables associated with antenna elements and/or RFID readers, etc., which can be used to provide confirmations to a user that the inventory management system has properly identified an item and/or the action performed by the user.

It should be understood that there can be many other aspects that may be stored in the data stores 915-919. The data stores 915-919 are operable, through logic associated therewith, to receive instructions from the server system 303 and obtain, update or otherwise process data in response thereto.

The memory 912 may also include the inventory management system 150, discussed above. The inventory management system 150 may be executable by the processor 900 to implement one or more of the functions of the server system 303. In one implementation, the inventory management system 150 may represent instructions embodied in one or more software programs stored in the memory 912. In another implementation, the inventory management system 150 can represent hardware, software instructions, or a combination thereof.

The server system 303, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An apparatus, comprising:
an antenna embedded inventory shelf, including:
a ground plane;
a substrate positioned on top of and adjacent to the ground plane and formed of a material having a low dielectric constant;
a plurality of antenna elements positioned along an upper surface of the substrate such that a radio frequency identification ("RFID") tag placed near an antenna element of the plurality of antenna elements will be energized by the antenna element; and
a protective cover positioned over the plurality of antenna elements, such that the plurality of antenna elements are positioned between the substrate and the protective cover.

2. The apparatus of claim 1, wherein each of the plurality of antenna elements are planar radiating transmission lines.

3. The apparatus of claim 1, wherein the ground plane is a gondola shelf.

4. The apparatus of claim 1, wherein the substrate comprises at least one of polyvinyl chloride, polystyrene, acrylonitrile butadiene styrene, high-density polyethylene, or low-density polyethylene.

5. The apparatus of claim 1, further comprising:
a plurality of load resistors, each of the plurality of load resistors terminating a respective antenna element.

6. The apparatus of claim 1, further comprising:
an RFID reader coupled to each of the plurality of antenna elements and configured to energize at least one of the plurality of antenna elements; and
a multiplexer coupled between the RFID reader and each of the plurality of antenna elements.

7. The apparatus of claim 6, wherein the multiplexer, in response to an input from the RFID reader, selects one or more of the plurality of antenna elements such that the selected one or more of the plurality of antenna elements are energized.

8. The apparatus of claim 6, wherein the multiplexer is incorporated into the RFD reader.

9. The apparatus of claim 1, further comprising:
a plurality of matching circuits, each matching circuit coupled to a respective antenna element of the plurality of antenna elements.

10. The apparatus of claim 1, wherein the protective cover is formed of a porous material configured to provide a separation between the plurality of antenna elements and an inventory item placed on the protective cover.

11. The apparatus of claim 1, wherein the protective cover is configured to reduce a detuning caused by an inventory item placed on the protective cover.

12. An apparatus comprising:
a ground plane;
a substrate formed of a material having a low dielectric constant and positioned on top of and adjacent the ground plane, the substrate configured to support a plurality of inventory items;
a plurality of antenna elements positioned along an upper surface of the substrate such that a radio frequency identification ("RFID") tag placed near an antenna element of the plurality of antenna elements will be energized by the antenna element; and
a protective cover positioned over the plurality of antenna elements, such that the plurality of antenna elements are positioned between the substrate and the protective cover.

13. The apparatus of claim 12, further comprising:
wherein the substrate comprises a material having a low dielectric constant to increase a field strength above a surface of the apparatus for each of the plurality of antenna elements.

14. The apparatus of claim 12, wherein the plurality of antenna elements are at least partially embedded into the substrate.

15. The apparatus of claim 12, wherein at least two of the plurality of antenna elements are substantially parallel to each other and extend from a rear of the substrate toward a front of the substrate.

16. The apparatus of claim 12, wherein each of the plurality of antenna elements are planar radiating transmission lines.

17. The apparatus of claim 12, further comprising:
a field emanating from each of the antenna elements; and
wherein each field overlaps at least one other field.

18. The apparatus of claim 17, wherein each field emanates between approximately two inches and approximately six inches above a surface of the apparatus.

19. The apparatus of claim 12, further comprising:
a plurality of load resistors, each of the plurality of load resistors positioned at an end of an antenna element and having a characteristic impedance substantially similar to an impedance of the antenna element.

20. The apparatus of claim 12, wherein the ground plane is a metal shelf of an existing shelf system.

21. An apparatus, comprising:
a substrate having a low dielectric constant and configured to support an inventory item;
an antenna element positioned along a surface of the substrate such that a tag identifier corresponding to the inventory item will be received by the antenna element when the inventory item is placed near the antenna element; and
a protective cover positioned over the antenna element, such that the antenna element is positioned between the substrate and the protective cover.

22. The apparatus of claim 21, further comprising:
a second antenna element positioned along the surface of the substrate.

23. The apparatus of claim 21, further comprising:
a ground plane; and
wherein the substrate is positioned on top of and adjacent the ground plane.

24. The apparatus of claim 21, further comprising:
a reader coupled to the antenna element and configured to energize the antenna element and receive the tag identifier from the antenna element.

* * * * *